Nov. 3, 1953
A. PETERS
2,657,762
DEVICE FOR REDUCING EXCESS LUBRICANT
ON RELATIVELY RECIPROCATING BODIES
Filed Oct. 26, 1949
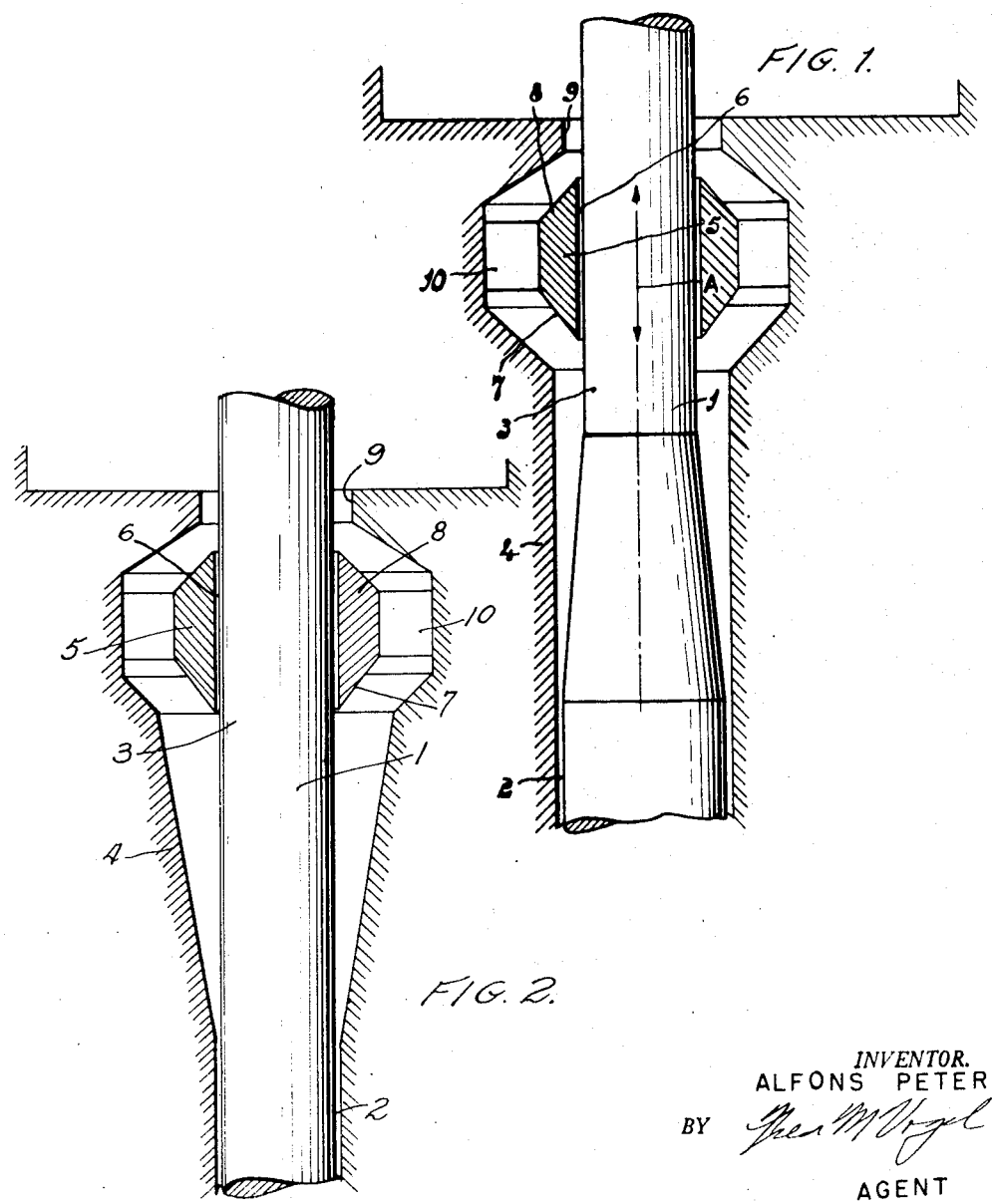
INVENTOR.
ALFONS PETERS
BY
AGENT Patented Nov. 3, 1953

2,657,762

UNITED STATES PATENT OFFICE 2,657,762

DEVICE FOR REDUCING EXCESS LUBRICANT ON RELATIVELY RECIPROCATING BODIES

Alfons Peters, Eindhoven, Netherlands, assignor to Hartford National Bank and Trust Company, Hartford, Conn., as trustee Application October 26, 1949, Serial No. 123,633

Claims priority, application Netherlands November 3, 1948

4 Claims. (Cl. 184—24)

This invention relates to devices for reducing the quantity of excess lubricant carried along with a cylindrical body performing a reciprocating movement relatively to and in a cylinder.

If a cylindrical body performing a reciprocating movement relatively to and in a cylinder and the contact surfaces of these bodies are lubricated, it is known that part of the lubricant is carried along the wall of the moving body, so that a quantity of excess lubricant accumulates at one side of this body. If the working space of an engine is located at this side, which may be the case if the body is, for example, a piston, a piston rod or a valve stem, this quantity of lubricant may find its way to the working space of the engine. In this space, the lubricant may adversely affect the operation of the engine. If the engine is, for example, an internal combustion engine, a compressor, a refrigerator, a hot-gas reciprocating engine or a steam engine, the lubricant may be carried along by the working medium in the working spaces of these engines and deposited at undesired areas in these engines, for example on heat exchangers. The term "heat exchangers" is to be understood to mean, for example, condensers, heaters, coolers or regenerators. Due to the layer of lubricant on these heat exchangers the heat transfer is reduced, so that the efficiency of the engine is adversely affected.

The lubricant carried along may furthermore cause considerable carbon deposits, for example, in internal combustion engines, by which the operation of the engine is also adversely affected. A further disadvantage consists in an excessive consumption of lubricant.

The present invention has for its object to reduce the excess quantity of lubricant, so that the aforesaid disadvantages are obviated or at least reduced.

According to the present invention, a device for reducing the quantity of excess lubricant carried along with a cylindrical body adapted to reciprocate relatively to and in a cylinder is characterized in that at least one of the surfaces of the body and the cylinder sliding along each other is substantially conical at least over part of its length, the conical slot thus formed between the body and the cylinder having its greatest transverse dimension at that end of the slot adjacent the space which is required to be kept free from excess lubricant and the conical slot being of such dimensions that, during the reciprocating movement of the body relatively to the cylinder, excess lubricant is pumped out of this slot, and viewed from the space which is required to be kept free from excess lubricant, provision is made of means for reducing the thickness of the lubricant film still adhering to the body during the movement of this body towards the space required to be kept free from excess lubricant, the excess lubricant being conveyed to the conical slot. It will be obvious that either the cylinder or the cylindrical body or both may be movable. By this arrangement it is achieved that when the relatively moving body travels in the direction of the smaller section of the conical slot, excess lubricant is pumped out of this conical slot by way of its smaller sectional area. Either the moving or the stationary body or both may have a conical shape.

The term "cylinder" is to be understood to mean a body formed by moving a generatrix parallel to itself along a closed directrix. The directrix will usually be a circle. However, ellipses, polygons or the like may also serve as directrices.

After having passed the conical slot, the moving body is still coated with a lubricant film. If this moving body enters the working space of an engine, at least part of this lubricant film may become detached from this body and deposited in the working space. Alternatively, part of the said layer of lubricant may be scraped off and find its way to the working space during the return stroke i. e. when the moving body leaves the working space. This is mitigated by using the device according to the invention. It is obvious that the means for reducing the thickness of the layer of lubricant may be constructed in practice in various ways. They may, for example, consist of scraping edges, scraper rings, bushing or grooves.

The means for reducing the thickness of the lubricant film may be combined with a straight-line guide for the cylindrical body. Thus, both a compact construction and a satisfactory straight-line guidance are ensured.

An alternative lubricant retaining device is obtained by providing, before the conical slot (viewed from the space which is required to be kept free from excess lubricant) a member which performs a scraping action at the surface of the reciprocating body when this body moves toward the conical slot, means being furthermore provided for reducing the thickness of the lubricant film adhering to the body in the other direction of motion of the moving body, the space before the scraping edge, which space is bounded by the surface of the moving body, communicating with the conical slot by way of a channel system.

Since the lubricant scraped off by the member performing the scraping action is required to flow as rapidly as possible to the conical slot, the member performing the scraping action may consist of a scraping edge which is at an acute angle with that direction of motion of the reciprocating body relatively to the scraping edge, in which this edge performs its scraping action.

The device according to the invention may be used for various purposes, for example for guiding rods such as piston rods, valve stems and so forth. The device may be used with a cylinder rotating about a stationary body which serves as a guide. It is furthermore possible to use the device with pistons moving in cylinders.

In order that the invention may be more clearly understood and readily carried into effect, it will now be described more fully with reference to the accompanying diagrammatic drawing, given by way of example.

The device shown in the drawing comprises a conical slot and scraping means.

Fig. 1 is a diagrammatic view of the device embodying the present invention, and Fig. 2 is a diagrammatic view of a modification of the device embodying the present invention.

Referring now to the drawing and especially to Fig. 1, a rod 1 is adapted to reciprocate according to the double-headed arrow A. The rod is moved back and forth by a crank shaft mechanism (not shown) connected to the lower end of the rod. To the upper end of the rod a piston (not shown) is connected, which is adapted to reciprocate in a working space.

In this device the rod 1 is conical. The rod is guided by cylindrical parts 2 and 3. The conical slot is formed by the wall of the sleeve 4 and the conical part of the rod 1. Above the conical part provision is made of scraping means for removing excess lubricant from the rod 1. These scraping means are secured to an annular body 5 of trapezoidal section. A bore 6 of the annular body 5 serves as a straight-line guide, the sides 7 and 8 acting as scraping edges. During the up-stroke excess lubricant is scraped off by the edge 7 and enters into the conical slot. The bore 9 of the working space is so large that during the return stroke no lubricant is scraped off at the area of the bore 9; this lubricant would enter into the working space. However, the scraping edge 8 at least partly scrapes off the film left, if any, the lubricant scraped off by the edge 8 finding its way through the channel 10 to the conical slot. During the reciprocating movement of the rod 1 a pumping effect is produced in the slot, so that the lubricant is carried off by way of the guide 2. If the rod guide 2 connects directly with the conical slot, so that the lubricant must be pumped away through the slot between the guide and the rod, the guide may be provided, throughout its length, with one or more grooves which permit lubricant to be more easily removed. As an alternative, provision may be made, for example midway the guide sleeve, of a short-circuiting channel which connects with the slot between sleeve and rod and through which lubricant is carried off. Fig 2 shows another embodiment of the present invention in which the cylinder is conical in shape over a portion of its length. The same beneficial results as accomplished by the construction shown in Fig. 1 are achieved by the structure illustrated in Fig. 2.

The embodiments described above are adapted to operate either in a vertical or in a horizontal position. Although in the foregoing reference is made to a precisely rectilinear movement of the body, it will be obvious that the relative movement of the moving body need not be exactly rectilinear since, for example, a rotary or a zigzag movement may be superposed on the rectilinear movement. This applies for example, to pistons driven by a swash-plate mechanism. Alternatively, the reciprocating movement may take place not along a straight line, but along a curve, for example in the case of oscillatory movements.

What I claim is:

1. Apparatus for reducing excess lubricant from reciprocating bodies, comprising a cylinder and a cylindrical body adapted to reciprocate relative to each other and having interfitting surfaces spaced apart by an intermediate space of small cross-section containing a lubricant, a scraping portion on said cylinder, channel connected spaces at opposite ends of said scraping portion, said cylinder being substantially conical over a portion of its length, a conical slot formed between the cylinder and said cylindrical body having its greatest transverse dimension at that end of the said conical slot adjacent the space on the said cylinder which is required to be kept free from excess lubricant, said conical slot being of such dimensions that during a movement of the said cylindrical body toward the said scraping portion excess lubricant is pumped out of said conical slot into one of the said channel connected spaces.

2. Apparatus for reducing excessive lubricant on relatively reciprocating lubricated bodies, comprising a cylinder-like body and a piston-like body adapted to reciprocate relative to and in the said cylinder-like body, said cylinder-like body having a channelled straight-line guide portion being provided with at least two scraping edges at the opposite ends thereof and surrounding the piston-like body, the surface of the said piston-like body being conical over a portion of its length, a conical slot between said cylinder-like body and said piston-like body having its greatest transverse dimension at that end of said conical slot adjacent the space on said cylinder-like body which is required to be kept free from excess lubrication, the said conical slot being of such dimensions that during the reciprocating movement of the said piston-like body relative to the said guide portion excess lubricant is pumped out of the said conical slot, one of the said scraping edges reducing the thickness of the lubricant film still adhering to the surface of the piston-like body during the movement of the said piston-like body towards the space required to be kept free from excess lubricant.

3. Apparatus for reducing excessive lubricant on reciprocating bodies, comprising two relatively reciprocating bodies having interfitting surfaces at a portion of their length and spaced apart by an intermediate space of small cross-section containing a lubricant, a scraping portion on one of said bodies being provided with channel connected lubricant storage spaces at the scraping ends thereof bounded by the surface of the other body, the scraping ends of the said scraping portion each being formed at an acute angle with the direction of motion of the other said body, the surface of one of the said bodies being conical over a portion of its length, the resulting conical slot formed between the said bodies at the said conical surface having its greatest transverse dimension at that end of the slot adjacent the space which is required to be kept free from excess lubricant.

4. Means for reducing excessive lubricant on relatively reciprocating bodies, comprising a cylinder and piston adapted to move in and out of the said cylinder, the said cylinder being provided with a straight-line guide portion for the said piston and having at least one scraping edge at each of the opposite ends thereof, channel connected lubricant storage spaces bounded by the said scraping edges and portions of the surface of the said piston, the surface of the said piston being conical over a portion of its length, a conical slot formed between the said cylinder and said piston at the said conical portion having its greatest transverse dimension at that end of the slot adjacent the space which is required to be kept free of excess lubricant, the said conical slot being of such dimensions that during the reciprocating movement of the piston relative to the guide excess lubricant is pumped out of the said slot, said scraping edge at one end of the said guide portion reducing the thickness of the lubricant film adhering to the said piston surface during a movement of said piston toward the space required to be kept free from excess lubricant, and the scraping edge at the opposite end of the said guide portion reducing the thickness of the lubricant film adhering to the piston surface when the said piston is moved in the direction away from the space required to be kept free from excess lubricant.

ALFONS PETERS.

References Cited in the file of this patent

UNITED STATES PATENTS

| Number | Name | Date |
|---|---|---|
| 1,006,431 | Cameron | Oct. 17, 1911 |
| 1,531,267 | Awe | Mar. 31, 1925 |
| 2,467,510 | Burg | Apr. 19, 1949 |

FOREIGN PATENTS

| Number | Country | Date |
|---|---|---|
| 14,173 | Great Britain | of 1914 |